(12) United States Patent
Mosek et al.

(10) Patent No.: US 7,286,067 B2
(45) Date of Patent: Oct. 23, 2007

(54) APPLIANCE WITH COMMUNICATION PROTOCOL EMULATION

(75) Inventors: Amir Mosek, Tel Aviv (IL); Amir Lehr, Hod Hasharon (IL)

(73) Assignee: SanDisk IL Ltd., Kfar Saba (IL)

( * ) Notice: Subject to any disclaimer, the term of this patent is extended or adjusted under 35 U.S.C. 154(b) by 0 days.

(21) Appl. No.: 11/352,220

(22) Filed: Feb. 13, 2006

(65) Prior Publication Data
US 2006/0195635 A1   Aug. 31, 2006

Related U.S. Application Data

(60) Provisional application No. 60/651,762, filed on Feb. 11, 2005.

(51) Int. Cl.
*H03M 9/00* (2006.01)

(52) U.S. Cl. .................. 341/100; 341/101; 710/62; 710/63; 710/65; 710/66

(58) Field of Classification Search ........ 341/100–101; 710/66
See application file for complete search history.

(56) References Cited

U.S. PATENT DOCUMENTS

| | | | | |
|---|---|---|---|---|
| 5,768,546 A | * | 6/1998 | Kwon | 710/307 |
| 5,802,399 A | * | 9/1998 | Yumoto et al. | 710/66 |
| 6,119,195 A | * | 9/2000 | Ellis et al. | 710/310 |
| 6,311,248 B1 | * | 10/2001 | Meiyappan et al. | 710/307 |
| 6,484,219 B1 | * | 11/2002 | Dunn et al. | 710/42 |
| 6,810,444 B2 | * | 10/2004 | Kimura | 710/27 |
| 6,829,663 B1 | * | 12/2004 | Ghaffari et al. | 710/71 |
| 6,871,244 B1 | * | 3/2005 | Cahill et al. | 710/62 |
| 6,950,889 B2 | * | 9/2005 | Ishida et al. | 710/65 |
| 6,961,790 B2 | * | 11/2005 | Swope et al. | 710/104 |

* cited by examiner

*Primary Examiner*—Khai M. Nguyen
(74) *Attorney, Agent, or Firm*—Mark Friedman

(57) ABSTRACT

An appliance includes a physical interface for communication according to a broad protocol and two functional components. The first functional component communicates via the physical interface. The second functional component includes a functional module adapted to communicate according to a narrow protocol and an emulation module that transforms between the two protocols so that the two functional components can communicate with each other using the physical interface.

28 Claims, 3 Drawing Sheets

US 7,286,067 B2

APPLIANCE WITH COMMUNICATION PROTOCOL EMULATION

This patent application claims the benefit of U.S. Provisional Patent Application No. 60/651,762, filed Feb. 11, 2005

FIELD AND BACKGROUND OF THE INVENTION

The present invention relates to the use of communication protocols within computerized devices, and in particular to modules that emulate one protocol on top of another protocol.

Computers and components communicate by sending and receiving electrical signals that represent data in the form of bits. The interfaces used for such communication are roughly categorized into serial interfaces, in which a single bit is transferred at a time, and parallel interfaces, in which multiple bits are transferred concurrently. Parallel interfaces vary in the number of data bits that are transferred concurrently, which can be considered to be the "breadth" of the interface; i.e. a sixteen-bit interface is "broader" than a four-bit interface, and the narrowest interface is obviously the serial interface that moves a single bit at a time.

Broader interfaces offer, potentially, a higher flow-rate of data, but require multi-wire connecting cables and circuits. This makes them more suitable for internal communication among computer components; accordingly the standard data bus of most computers uses parallel interfaces of 16-64 bits. Another important advantage of a parallel interface is in its being suitable for RAM protocols that run applications directly from memory, and specifically boot code protocols that initialize the fundamental functionalities of a computer or a computerized appliance upon the appliance being connected to a power source. When connecting a computer to external or detachable components, such as peripherals or memory cards, the size and reliability of the connectors and cables become a primary consideration, which pushes connections to peripherals or detachable components toward narrower interfaces, often serial interfaces.

Three commonly-used narrow interfaces for connecting external devices or detachable components that have been standardized by the computer industry are Universal Serial Bus (USB) that is a serial interface, MultiMediaCard (MMC) that is a narrow interface of one to eight bits, and SecureDigital (SD) that is a narrow interface of one to four bits. These standards define physical, electrical and logical characteristics that ensure efficient and reliable data transfer between devices that implement the standards.

When a computer or computerized appliance uses a bus of 16-64 bits internally and communicates externally through narrower buses of, typically, 1-8 bits, protocol converters, usually in the form of hardware components or subcomponents, are included to transform one communication protocol to another.

FIG. 1 illustrates an exemplary system 100 of the background art, wherein a host 110, for example a personal computer or computerized appliance, is connected to a peripheral storage device 130 via a USB link 126. A USB link, under the USB standard, uses four wires, but only one data bit is transferred at a time. Host 110 has a CPU (central processing unit) 112 that is configured by applications and drivers (not shown) to send storage-related commands, such as read and write commands, to storage device 130. Such commands leave CPU 112 on an internal bus 124 that is designed according to the architecture of internal computer buses for communication between CPU 112 and all internal components (e.g. hard disk, optical drive, modem, network card, etc.), and that is usually a broad parallel interface of 16 to 64 bits. A host controller 116 converts the commands that have been received from CPU 112 into a serial USB protocol in order to send the commands through a serial USB link 126. When received by a client controller 134, the commands are transformed by controller 134 to commands transferred through a parallel communication link 144, for executing the actual storage-related operations on a storage module 136. Controller 134 contains a communication controller 138 and a storage management controller 132. It will be noted that controller 134 is representative of all components of storage device 130 that include processing capability, and may be implemented as a single or multiple physical units.

The popularity of external peripherals and detachable components has pushed many popular software modules, component designs and commercial components toward narrower communication interfaces, such as USB or MMC. A special situation of interest arises, however, when a designer of an appliance is attracted by the performance, standardization, availability or cost of a design adapted for a protocol of a narrow interface such as USB or MMC, while wishing to fix that component permanently within an appliance. In such a situation, the benefits of narrow interfaces for external connections or detachability become irrelevant, and the employment of hardware protocol converters that are customarily used for detachable or externally-connected components implies extra complexity, cost, space, and possibly also degraded performance.

There is thus a need for solutions that allow integrating component designs originally adapted for narrow interfaces, into appliances that use a broader communication interface, without the need for protocol conversion by hardware.

SUMMARY OF THE INVENTION

As understood herein, a "broad" or "narrow" protocol is a protocol intended for use with a "broad" or "narrow" physical interface. "Breadth", in this context, is defined as the number of bits exchanged concurrently: a 16-bit interface or protocol is twice as broad as an 8-bit protocol.

As understood herein, an "appliance" is any standalone computerized device, including, for example, a personal computer of any size and form, a mobile telephone, a two-way pager, a digital camera and a digital music player. As understood herein, a "component" is a part of an appliance that has a distinct role in the appliance.

According to the present invention there is provided an appliance including: (a) a physical interface for communication according to a first protocol; (b) a first functional component adapted to communicate via the physical interface; and (c) a second functional component including: (i) a functional module adapted to communicate using a second protocol that is narrower than the first protocol, and (ii) an emulation module for transforming between the first and second protocols to enable the first and second functional components to communicate with each other using the physical interface.

According to the present invention there is provided a component, for an appliance that includes a physical interface that uses a first protocol and a central processing unit that communicates via the physical interface, the component including: (a) a functional module adapted to communicate using a second protocol that is narrower than the first protocol; and (b) an emulation module for transforming between the second protocol and the first protocol to enable the central processing unit and the component to communicate with each other using the physical interface.

According to the present invention there is provided a central processing unit, for an appliance that includes a physical interface that uses a first protocol and a component that communicates via the physical interface, the central processing unit including: (a) a functional module adapted to communicate using a second protocol that is narrower than the first protocol; and (b) an emulation module for transforming between the second protocol and the first protocol to enable the central processing unit and the component to communicate with each other using the physical interface.

An appliance of the present invention includes a physical interface for communication according to a first protocol and two functional components. The first functional component is adapted to communicate via the physical interface. The second functional component includes a functional module adapted to communicate using a second protocol, such as a USB protocol, a MMC protocol or a SD protocol, that is narrower than the first protocol. The USB protocol is an example of a second protocol that is a protocol of a serial interface. To enable the two functional components to communicate with each other using the physical interface, the second functional component also includes an emulation module for transforming between the two protocols.

Preferably, the second functional component is a central processing unit of the appliance and the first functional component is a data storage device such as a flash memory data storage device. Alternatively, the second functional component is a data storage device such as a flash memory device and the first functional component is a central processing unit of the appliance.

Preferably, the physical interface is a random access interface.

The scope of the present invention also includes the second functional component separately, for example as a central processing unit of the appliance.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a computer system and system component in which logical emulation of a standard communication protocol is used in conjunction with a physical interface that is broader than the physical interface supported by the protocol. Specifically, the present invention can be used to implement component designs originally intended for USB, MMC or SD communication through a broader communication interface.

The principles and operation of data exchange within a computer system according to the present invention may be better understood with reference to the drawings and the accompanying description.

The invention benefits from the ubiquity, reliability, cost and availability of component designs or software modules originally prepared under the logical characteristics of a ubiquitous standard narrow communication protocol (such as USB or MMC), while also benefiting from the advantages of a broader communication protocol, such as improved performance, code execution from memory, and boot from memory.

This object of the present invention is met by adding an emulated protocol converter ("emulator") to a system which for example may include a CPU and a memory device. The emulator of the present invention is configured to receive commands that comply with the standard logical characteristics of a communication protocol for a narrow communication link and to transmit these commands over a different, broader communication link. For example, if the communication protocol is the USB protocol then the present invention uses, with the USB protocol, a communication link that allows the passing of more than one bit concurrently. The positioning of the emulator with regard to the other components in the system varies in different embodiments of the present invention. The preferred embodiments shown in FIGS. 2 and 3 illustrate some options for positioning the emulator relative to the other system components.

Figure 2:
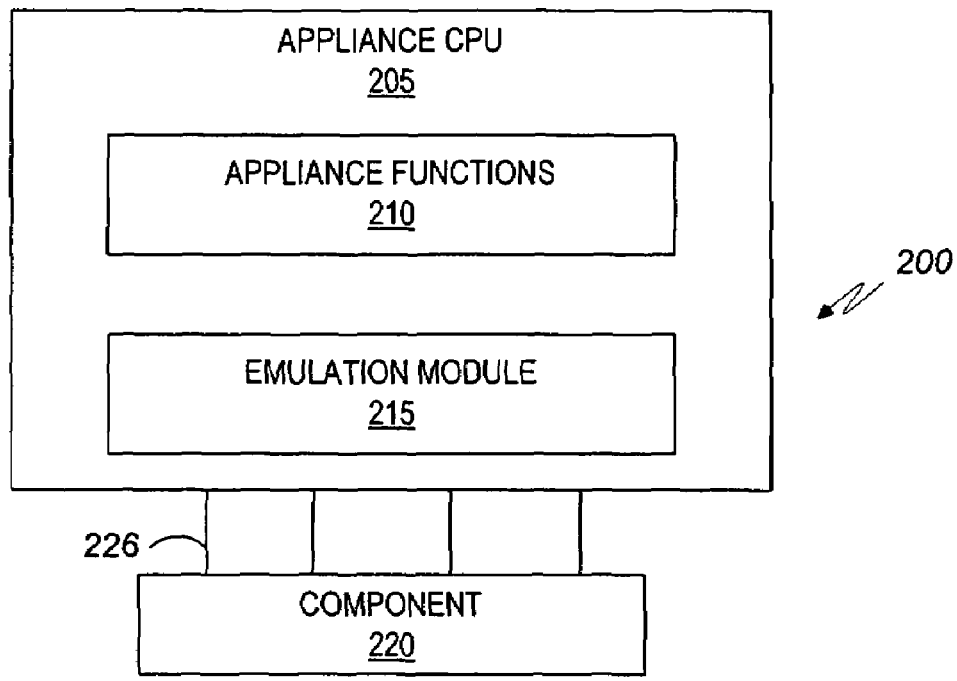
FIGS. 2 and 3 are schematic block diagrams of systems of the present invention.

Returning now to the drawings, FIG. 2 illustrates an appliance 200 according to a first preferred embodiment of the present invention. An appliance CPU 205 is a processor configured to run various appliance functions 210, such as operating system services, drivers, user applications and/or dedicated functionalities such as picture taking, voice recording, telephony or music playing, according to the nature of appliance 200. For example, component 220 may be a non-volatile memory device such as a flash memory device. Specifically, appliance functions 210 make use of a component 220 that is permanently or semi-permanently embedded within appliance 200. Appliance functions 210 include software modules that have been programmed to cooperate with component 220 presuming that component 220 uses a narrow protocol, e.g. a USB protocol. However, the actual communication link 226 between CPU 205 and component 220 uses a broader protocol than that presumed by the appliance functions 210 that use component 220. The discrepancy between the protocols is resolved by an emulation module 215 that logically interfaces between appliance functions 210 and component 220 so that, while appliance functions 210 still send and receive commands to and from component 220 based on a narrow protocol, emulation module 215 ensured that such commands are properly converted, on their way to and from component 220, so that component 220 communicates using the protocol of link 226.

It will be appreciated that, in principle, appliance functions 210 could have been designed to use the broader protocol of link 226 for communicating with component 220, thus obviating the need for emulation module 215. However, the present invention allows using an available, advantageous design of appliance functions 210, that were originally designed, for one reason or another, for narrower communication, to be utilized within the present configuration without being modified. Thus, emulation module 215 of the present invention, that is external to appliance functions 210, allows using an available module originally designed for a narrower protocol, without appliance functions 210 being aware of the different protocol of component 220. Similarly, component 220 designed for the broader communication of link 226, is unaware of the actual narrower protocol which is actually used by appliance functions 210.

Figure 3:
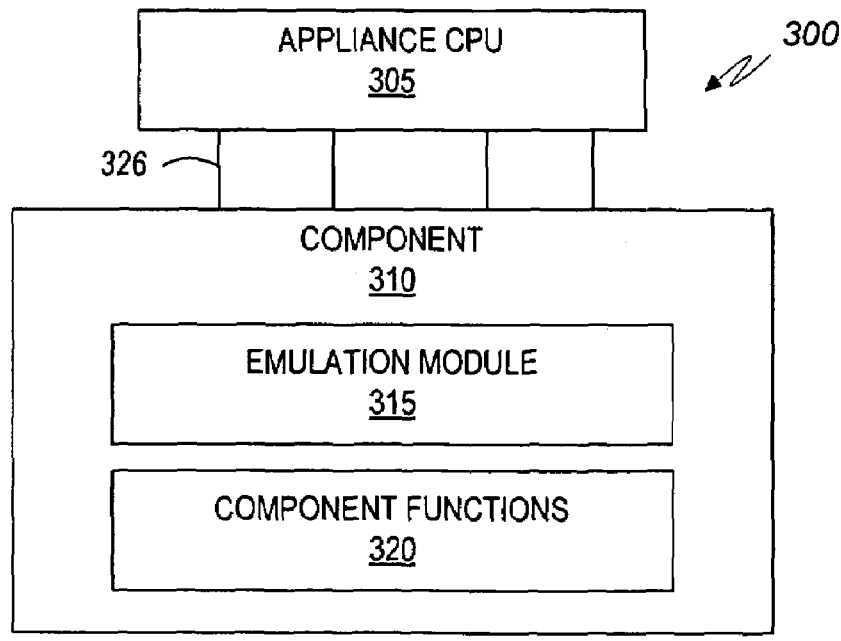

FIG. 3 illustrates an alternative preferred embodiment of an appliance 300, in which the standardized, narrow protocol is a characteristic of a component 310, whereas an appliance CPU 305 is the appliance component that uses a broader protocol. Component 310, in the present embodiment, is smart, in the sense that component 310 includes a programmable controller (not shown) for its functionality. Component functions 320 of component 310 include hardware and software for providing a useful service to appliance CPU 305. Component functions 320 are designed to receive and send data through a narrow communication channel, such as USB or MMC. However, the actual communication link 326 between component 310 and appliance CPU 305, is broader than that for which component functions 320 were designed. To overcome this discrepancy, emulation module 315, that is preferably a software code that runs on the controller of component 310, transforms the data flowing both ways between component functions 320 and appliance CPU so that appliance CPU 305 "sees" only the broader communication protocol it is designed for, while component functions 320 "see" only the narrower protocol they expect.

It will be noted that emulation modules 215 are 315 contain software code modules executing on processors that already exist in the respective implementations (CPU 205 and the controller of component 310). It will be appreciated that these emulation modules allow the respective appliance, 200 and 300, to include components or software modules that have been originally designed for a narrow communication protocol, within an environment that employs a broader communication protocol.

Figure 1:
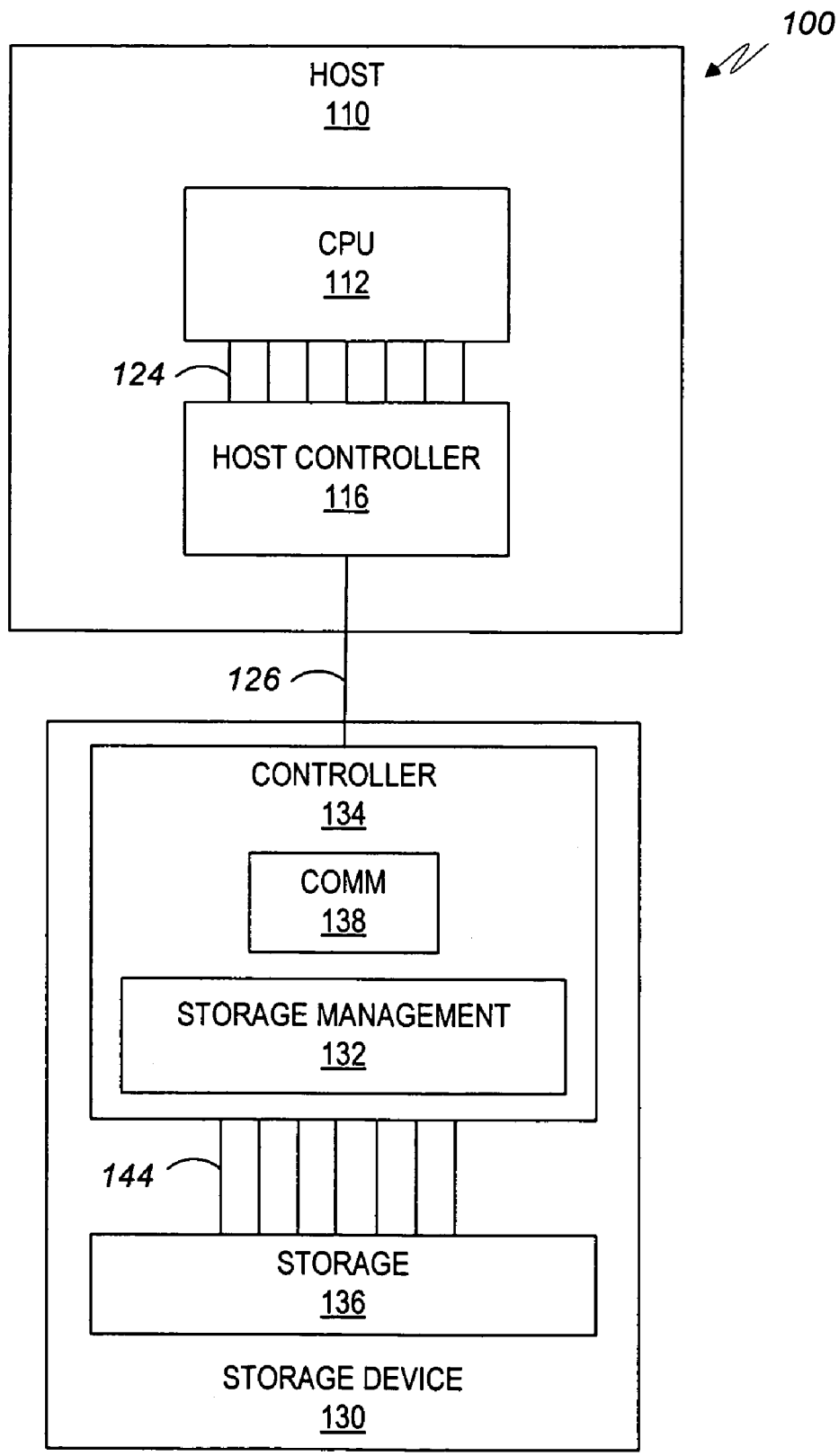
FIG. 1 is a schematic block diagram of a background art device and host.
Figure 4:
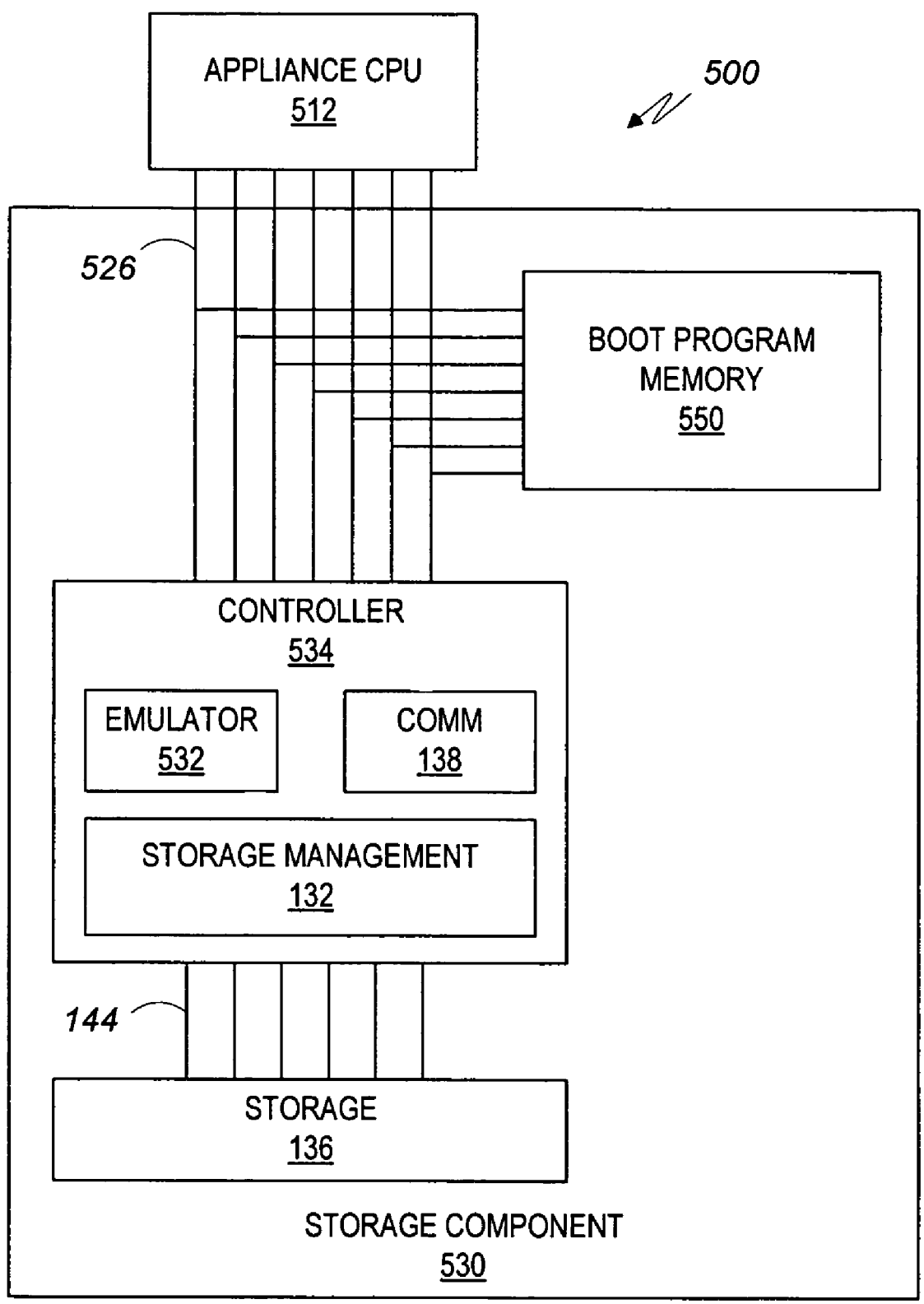
FIG. 4 is a schematic block diagram of a specific example of the system of FIG. 3.

FIG. 4 illustrates the embodiment of FIG. 3 implemented in a modified version of the prior-art example of FIG. 1. Thus, the designer of an appliance 500 selects to embed, as a fixed component and with minimum modifications, the design of removable storage device 130 of FIG. 1. However, the use of USB link 126 makes no sense under the present fixed configuration, thus rendering host controller 116 redundant. However, the designer of appliance 500 wants to minimize the modifications to the existing components of storage device 130. As an additional benefit, a main communication bus 526 of appliance 500 supports RAM protocol that allows running programs, and especially booting appliance 500 from a boot program memory 550.

A storage component 530 retains the main design elements of storage device 130 of FIG. 1, including storage module 136, storage management module 132, and even USB communication module 138 (possibly with some modifications). However, USB communication module 138 is unsuitable for interfacing with broader communication link 526. For that reason, storage component 530 includes an emulator module 532 in controller 534. Accordingly, any data received by controller 534 via broad communication link 526 is transformed by controller 534 to USB commands that can be further processed by controller 534, under the instructions of storage management module 132, into operations on storage module 136. Conversely, all data received by controller 534 from storage management module 132 are transformed by controller 534 through emulation module 532, for transmitting over the broader communication link 526.

Storage component 530 also includes a boot program memory 550, to take advantage of the support by bus 526 of the RAM protocol that allows booting from storage component 530. For example, in one exemplary embodiment of the present invention, storage component 530 is configured as described in the commonly-owned co-pending patent application titled NAND FLASH MEMORY SYSTEM ARCHITECTURE and published as U.S. patent application Publication No. 2006/0184724, which patent application is incorporated by reference for all purposes as if fully set forth herein. Storage module 136 is a NAND flash memory in which boot code for appliance 500 is stored. Boot program memory 550 is a SRAM. On power-up, controller 534 copies the boot code from storage module 136 to boot program memory 550 and appliance CPU 512 executes the boot code from boot program memory 550.

While the invention has been described with respect to a limited number of embodiments, it will be appreciated that many variations, modifications and other applications of the invention may be made.

What is claimed is:

1. An appliance comprising:
   (a) a physical interface for communication according to a first protocol;
   (b) a first functional component adapted to communicate via said physical interface; and
   (c) a second functional component including:
      (i) a functional module adapted to communicate using a second protocol that is narrower than said first protocol, and
      (ii) an emulation module for transforming logically between commands of said first protocol and commands of said second protocol to enable said first and second functional components to communicate with each other using said physical interface.

2. The appliance of claim 1, wherein said second functional component is a central processing unit of the appliance.

3. The appliance of claim 1, wherein said first functional component is a data storage device of the appliance.

4. The appliance of claim 3, wherein said data storage device is a flash memory data storage device.

5. The appliance of claim 1, wherein said second functional component is a data storage device of the appliance.

6. The appliance of claim 5, wherein said data storage device is a flash memory data storage device.

7. The appliance of claim 1, wherein said first functional component is a central processing unit of the appliance.

8. The appliance of claim 1, wherein said second protocol is a Universal Serial Bus protocol.

9. The appliance of claim 1, wherein said second protocol is a MultiMediaCard protocol.

10. The appliance of claim 1, wherein said second protocol is a SecureDigital protocol.

11. The appliance of claim 1, wherein said physical interface is a random access interface.

12. The appliance of claim 1, wherein said second protocol is a protocol of a serial interface.

13. The appliance of claim 1, wherein said emulation module enables said first and second functional components to communicate with each other while preserving data precision.

14. A component, for an appliance that includes a physical interface that uses a first protocol and a central processing unit that communicates via the physical interface, the component comprising:
   (a) a functional module adapted to communicate using a second protocol that is narrower than the first protocol; and
   (b) an emulation module for transforming logically between commands of said second protocol and commands of said first protocol to enable the central processing unit and the component to communicate with each other using the physical interface.

15. The component of claim 14, wherein said functional module is a data storage module.

16. The component of claim 15, wherein said data storage module is a flash memory data storage module.

17. The component of claim 14, wherein said second protocol is a Universal Serial Bus protocol.

18. The component of claim 14, wherein said second protocol is a MultiMediaCard protocol.

19. The component of claim 14, wherein said second protocol is a SecureDigital protocol.

20. The component of claim 14, wherein said second protocol is a protocol of a serial interface.

21. The component of claim 14, wherein said emulation module enables the central processing unit and the component to communicate with each other while preserving data precision.

22. A central processing unit, for an appliance that includes a physical interface that uses a first protocol, and a component that communicates via the physical interface, the central processing unit comprising:
  (a) a functional module adapted to communicate using a second protocol that is narrower than the first protocol; and
  (b) an emulation module for transforming logically between commands of said second protocol and commands of said first protocol to enable the central processing unit and the component to communicate with each other using the physical interface.

23. The central processing unit of claim 22, wherein said second protocol is a Universal Serial Bus protocol.

24. The central processing unit of claim 22, wherein said second protocol is a MultiMediaCard protocol.

25. The central processing unit of claim 22, wherein said second protocol is a SecureDigital protocol.

26. The central processing unit of claim 22, wherein said second protocol is a serial protocol.

27. The central processing unit of claim 22, wherein said emulation module enables the central processing unit and the component to communicate with each other while preserving data precision.

28. An appliance comprising:
  (a) a physical interface for communication according to a first protocol;
  (b) a data storage device adapted to communicate via said physical interface; and
  (c) a central processing unit including:
    (i) a functional module adapted to communicate using a second protocol that is narrower than said first protocol, and
    (ii) an emulation module for transforming between said first and second protocols to enable said data storage device and said central processing unit to communicate with each other using said physical interface.

* * * * *